(12) United States Patent
Krammer et al.

(10) Patent No.: US 9,884,561 B2
(45) Date of Patent: Feb. 6, 2018

(54) CHARGING SYSTEM

(71) Applicant: Bayerische Motoren Werke Aktiengesellschaft, Munich (DE)

(72) Inventors: Josef Krammer, Holzkirchen (DE); Jens Berger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/511,996

(22) Filed: Oct. 10, 2014

(65) Prior Publication Data

US 2015/0028811 A1 Jan. 29, 2015

Related U.S. Application Data

(63) Continuation of application No. PCT/EP2013/057440, filed on Apr. 10, 2013.

(30) Foreign Application Priority Data

Apr. 12, 2012 (DE) .................. 10 2012 205 972

(51) Int. Cl.
*H02J 7/00* (2006.01)
*H02J 7/02* (2016.01)
(Continued)

(52) U.S. Cl.
CPC ....... *B60L 11/1811* (2013.01); *B60L 11/1816* (2013.01); *B60L 11/1818* (2013.01);
(Continued)

(58) Field of Classification Search
CPC .................. B60L 11/1838; B60W 10/26
(Continued)

(56) References Cited

U.S. PATENT DOCUMENTS 1,193,563 A * 8/1916 Vitale ..................... F21V 1/00
                                                    40/554
2,540,841 A * 2/1951 Stancu .................. H01F 27/266
                                                    219/202

(Continued)

FOREIGN PATENT DOCUMENTS

DE   24 14 329 A1   10/1975
DE   203 01 677 U1   9/2003
(Continued)

OTHER PUBLICATIONS

International Search Report (PCT/ISA/210) dated Feb. 3, 2014 with English translation (seven pages).
(Continued)

*Primary Examiner* — Samuel Berhanu
*Assistant Examiner* — Tarikh Rankine
(74) *Attorney, Agent, or Firm* — Crowell & Moring LLP

(57) ABSTRACT

A system includes a vehicle with a charge socket and a contactor switching unit, and a charger for charging an electrical energy accumulator of the vehicle at a vehicle-external AC power system. The charger is a vehicle-external charger device. The charger is a portable charger. The charger has a DC-DC converter, and includes first and second charging cables. The first charging cable has an AC power system plug, and the second charging cable has a charge plug.

16 Claims, 4 Drawing Sheets

(51) Int. Cl.
*B60L 11/18* (2006.01)
*H01M 2/10* (2006.01)
*H02G 11/02* (2006.01)

(52) U.S. Cl.
CPC ............ *H02G 11/02* (2013.01); *H02J 7/0031* (2013.01); *H02J 7/0042* (2013.01); *B60L 11/1838* (2013.01); *B60L 2230/12* (2013.01); *H02J 7/0027* (2013.01); *Y02T 10/7005* (2013.01); *Y02T 10/7088* (2013.01); *Y02T 90/121* (2013.01); *Y02T 90/128* (2013.01); *Y02T 90/14* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 4,227,710 | A * | 10/1980 | Laub | A63B 55/08 211/60.1 |
| 5,072,909 | A * | 12/1991 | Huang | B60N 3/102 248/215 |
| 5,855,262 | A * | 1/1999 | Jackson | B60L 11/1816 191/12.4 |
| 6,005,230 | A * | 12/1999 | White, Jr. | G05D 23/1951 219/492 |
| 6,417,645 | B1 * | 7/2002 | Yamaguchi | H02J 7/0044 320/115 |
| 7,151,356 | B1 * | 12/2006 | Chen | G06F 1/263 320/107 |
| 7,607,630 | B2 * | 10/2009 | Jung | A45C 13/001 190/18 R |
| 8,378,628 | B2 * | 2/2013 | Ichikawa | B60L 3/0069 320/109 |
| 2001/0003416 | A1 * | 6/2001 | Kajiura | B60L 11/1825 320/109 |
| 2001/0033148 | A1 * | 10/2001 | Duerbaum | H05K 7/20427 320/107 |
| 2004/0130288 | A1 | 7/2004 | Souther et al. | |
| 2005/0070155 | A1 * | 3/2005 | Horenstein | H01R 11/288 439/522 |
| 2005/0200206 | A1 | 9/2005 | Hussaini et al. | |
| 2007/0222410 | A1 * | 9/2007 | Lee | H01L 31/0236 320/101 |
| 2007/0257146 | A1 * | 11/2007 | Fleming | B65H 75/14 242/405.3 |
| 2009/0066288 | A1 | 3/2009 | Altekruse et al. | |
| 2009/0082916 | A1 * | 3/2009 | Tanaka | B60K 6/48 701/22 |
| 2011/0055037 | A1 * | 3/2011 | Hayashigawa | B60L 3/0069 705/26.1 |
| 2011/0169447 | A1 * | 7/2011 | Brown | B60L 3/0069 320/109 |
| 2012/0081073 | A1 | 4/2012 | Niemann et al. | |
| 2013/0134933 | A1 * | 5/2013 | Drew | H02H 5/04 320/109 |

FOREIGN PATENT DOCUMENTS

DE 10 2009 042 059 A1 3/2011
WO WO 2011/045248 A2 4/2011

OTHER PUBLICATIONS

German Search Report dated Mar. 6, 2013 with partial English translation (10 pages).

* cited by examiner

CHARGING SYSTEM

CROSS REFERENCE TO RELATED APPLICATIONS

This application is a continuation of PCT International Application No. PCT/EP2013/057440, filed Apr. 10, 2013, which claims priority under 35 U.S.C. § 119 from German Patent Application No. 10 2012 205 972.5, filed Apr. 12, 2012, the entire disclosures of which are herein expressly incorporated by reference.

BACKGROUND AND SUMMARY OF THE INVENTION

The invention relates to a charge system comprising a vehicle with a charge socket and with a contactor switching unit, and comprising a charger device for charging an electrical energy accumulator of the vehicle from a vehicle-external AC power system.

Plug-in hybrid and electric vehicles have at least one charging interface which permits an electrical energy accumulator of the vehicle to be charged from an external electrical energy source.

In the prior art, charge systems are known in which a charger device makes available electrical DC voltage in order to charge a traction battery. This is described, for example, in US 2004/0130288 A1. The charger device is a component of a charging architecture of the vehicle. According to the same document, what is referred to as electric vehicle service equipment (EVSE) according to the specification SAE J1772 is located outside the vehicle, said specification dealing with electrical and electronic specifications for the charge transfer from the external power source to the vehicle.

An object of the invention is to provide an improved charge system comprising a vehicle with a charge socket and a contactor switching unit and comprising a charger device for charging an electrical energy accumulator of the vehicle from a vehicle-external AC power system.

This and other objects are achieved according to the invention, wherein the charger device is a vehicle-external and portable charger device which comprises a DC-DC converter, a first charging cable with an AC power system plug and a second charging cable with a charge plug.

This means that the vehicle can be charged with DC current from an external AC power source. The charger device rectifies the power which originates from the source and is transferred by the first charging cable. The vehicle is supplied by the charger device with a DC voltage via the second charging cable. The charger device, together with the cabling, is portable. The charging cables can be permanently connected to the charger device. That is to say, the charging of the vehicle can be charged independently of locations of DC charging stations at any desired access to the AC power system. However, since the charger device is not permanently integrated into the vehicle, valuable installation space can be provided for another use or for a more compact design of the vehicle with a lower overall mass. In particular, for short-distance journeys or on routes with an available DC charging infrastructure (for example, DC recharging stations, charging stations) the need to carry along a mobile charger device can be entirely eliminated.

According to a further embodiment of the invention, the charger device comprises a housing which has external cooling fins and through which at least one cooling duct runs. This cooling duct is configured for a flow of air through the housing.

The cooling fins and the at least one cooling duct bring about air cooling of the charger device. Since the latter is located outside the vehicle, the convective circulation of the ambient air permits the heat, which is produced during the rectification to be transported away. The cooling fins and the cooling duct improve the heat transfer by enlarging the surface which is in contact with the surroundings. Given a preferred vertical orientation, a directed flow is produced, i.e. a flow with a preferred flow direction counter to gravity, which is also referred to as a "chimney effect" and which, additionally, promotes the heat transfer.

Furthermore, it is advantageous if the housing has a first lid and a second lid. The housing, the first lid and the second lid form a winding reel. And, the first charging cable and the second charging cable can each be wound on to the winding reel.

By virtue of the design of the charger device, the cables which are associated with the charger device can be wound on to the charger device.

Alternatively, the housing can have an automatic cable retractor, for the first charging cable and for the second charging cable, respectively.

Automatic cable retractors may be configured, for example, as a cable rolling drive with a main spring.

According to a further embodiment of the invention, the charger device has at least one thermally insulated carrying handle and at least one thermally insulated stand.

Power electronics of the DC-DC converter of the charger device generate heat during rectification. A carrying handle which does not conduct heat, or only conducts heat poorly, ensures a thermal contact protection for the user during a charging process. A stand which does not conduct heat or only conducts heat poorly prevents heat from being transferred to a standing surface of the charger device.

As a result of the at least one stand, the charger device can be positioned on a standing surface for charging. On this standing surface, for example a garage floor, the stand supports the charger device in a non-tilting fashion.

It is also advantageous if the charger device comprises at least one foldable carrying handle and at least one foldable stand, and the at least one carrying handle secures, in a folded-in state, a charging cable which is wound on to the winding reel, and the at least one stand secures, in a folded-in state, a charging cable which is wound on to the winding reel.

It can therefore be ensured that the winding of a wound-on cable permanently has stability when the carrying handle is folded in and when the stand is folded in, and the cable winding does not slip down from the winding reel.

According to a further variant, the vehicle comprises a storage space and the storage space is configured to transport the portable charger device.

In the storage space, the charger device can be carried along by a user in the vehicle. In this way, the vehicle can be charged independently of the location at any place where there is access to an AC power system. This is particularly advantageous for relatively long routes with uncertainty about the availability of DC charging sources along the route.

Furthermore, the vehicle comprises a charge control unit which unidirectionally detects charge control signals from the charger device via the second charging cable. The signals are preferably control signals which are necessary for controlling the charging sequence of a DC charging method.

The charger device can also have a charging communication unit. Data communication between the charger device and the vehicle can be established between the charge communication unit and the charge control unit via the second charging cable when the charge plug is plugged into the charge socket. This charge communication permits the charging process to be regulated and monitored with the charger device.

The charger device can additionally have a protection circuit between the two charger cables, which protection circuit satisfies the safety requirements of an EVSE according to SAE J1772. This also comprises a logic for setting a maximum charge current and a voltage disconnection unit.

According to one preferred embodiment of the invention, the system comprises an attachment mechanism for a wall to which the charger device can be secured by means of the at least one carrying handle for the purpose of charging or storage. This means that the charger device can be attached to a wall using the carrying handle and the attachment mechanism. According to this embodiment, the charger device can be configured alternatively for attachment to a wall or for positioning on a standing surface.

According to a further embodiment of the invention, the at least one carrying handle comprises a holding rail with which the charger device can be hung from a partially lowered side window of the vehicle. By closing the window and locking the vehicle, which can be triggered, for example, via the user by means of a remote control key of the vehicle or by means of data communication between the charger device and the charge control unit when a connection is established between the charge plug and the charge socket, the charger device can be clamped by the carrying handle between the window and the associated window frame and, therefore, protected against theft.

The invention is based on the ideas presented below.

The prior art describes cable-bound charging for charging electric vehicles and plug-in hybrid vehicles, both as AC charging and as DC charging. In the case of AC charging, the charger device is accommodated in the vehicle. In the case of DC charging, the conversion of the AC current takes place in a charging station, a wall box or a charging pillar outside the vehicle. Standards for interfaces for the vehicle are currently under development for both methods. A charging infrastructure for AC charging requires a considerable integration expenditure in the vehicle as a function of the power requirement. DC charging permits significantly higher charging powers than AC charging.

In order to permit DC charging independently of DC charging stations or wall boxes, for example at sockets which are customary in the domestic sphere, an AC/DC charger device is to be additionally integrated into the vehicle. This means that a charger device which is installed in the vehicle, which takes up installation space in the vehicle and which constitutes additional vehicle weight is to be carried along. In addition, a suitable charging cable is to be carried along which is equipped partly with prescribed safety functions in order to produce a connection between the vehicle-external AC power source and the AC/DC charger device in the vehicle.

Therefore, in one preferred embodiment, a mobile charger device with two charging cables which converts AC current into DC current outside the vehicle and comprises prescribed safety functions is proposed. A mobile charger device provides a reduction in weight in the vehicle and can be replaced with other mobile charger devices with a different electrical power. What limits the power is the maximum power level which can be drawn from the AC power system to which power level the current-carrying capacity of the charging cable which connects the AC power source to the charger device can be adapted.

Other objects, advantages and novel features of the present invention will become apparent from the following detailed description of one or more preferred embodiments when considered in conjunction with the accompanying drawings.

DETAILED DESCRIPTION OF THE DRAWINGS

Identical reference symbols in the figures represent identical technical features.

Figure 1:
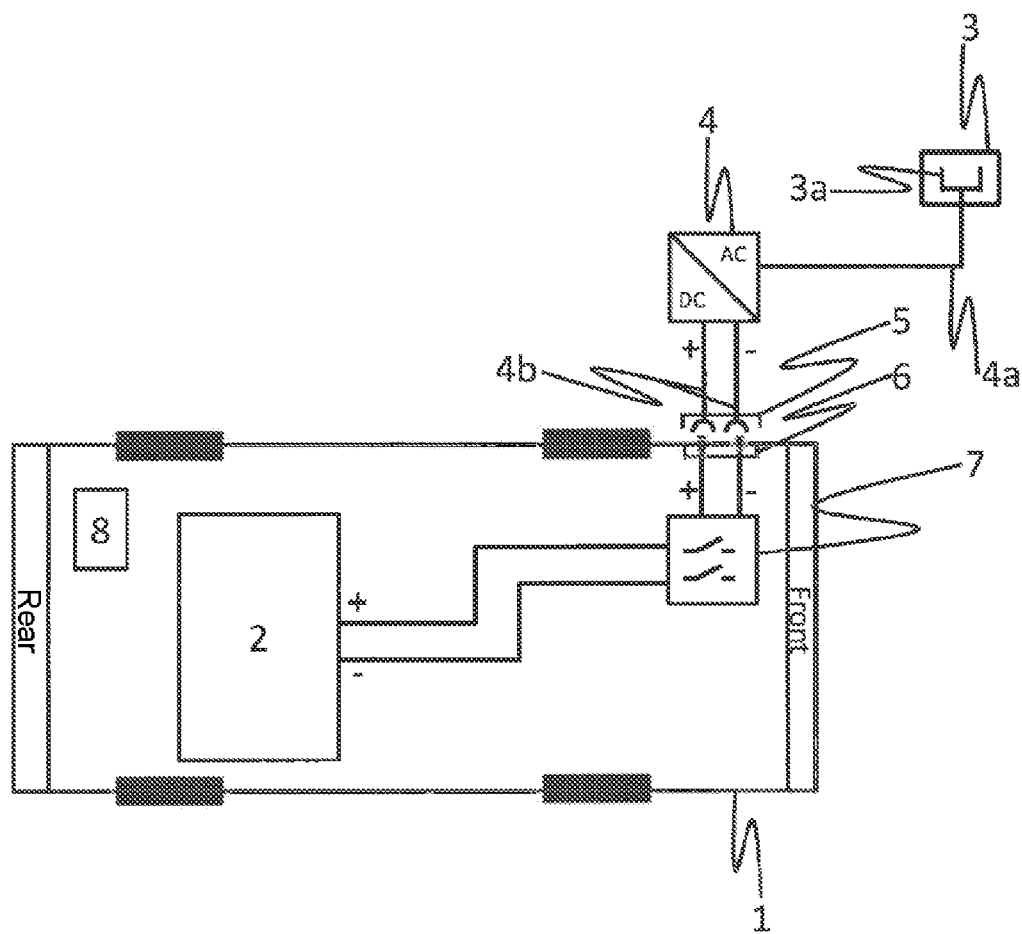
FIG. 1 is a schematic diagram of a charge system with a vehicle, charger device and external AC power source.

FIG. 1 shows a mobile charger device (4) for a plug in hybrid or electrical vehicle (1) for charging an electrical energy accumulator (2) of the vehicle (1). The vehicle has a DC charging interface (6), preferably in the form of a charge socket. The vehicle can be connected via the charge socket to an external DC power source in order to charge the vehicle. An electrical path between the charge socket and the energy accumulator is integrated into the vehicle, said path having, from a charge control unit of the vehicle, a switchable contactor (7) per DC voltage polarity.

A charge plug for charging the vehicle can be connected to the charge socket, which charge plug is associated with a DC charging station or with a DC charging pillar. For safety reasons, when a connection is established between the charge socket and the charge plug, the charge control unit then connects the contactor to a conductive connection when various safety measures are taken. These are not to be considered here in any more detail.

According to the embodiment in FIG. 1, as an alternative to a DC charging station, the vehicle can also be supplied with DC current by the charger device (4) in order to charge the energy accumulator (2). For this purpose, the charger device is electrically connected to an AC power system (3) with a first charging cable (4A) on which an AC power system plug (3a), for example a Schuko plug, is located, in order to charge the vehicle. The AC power system can be, for example, a single-phase AC power system with 230 V and a maximum phase current strength of 16 amps.

The charger device (4) is supplied with AC current from the external power system via an AC input and rectifies the AC current. The charger device comprises an AC/DC transformer with an output DC voltage which can be adapted to the vehicle accumulator. When the charge plug-charge socket connection is established, the rectified current is transferred to the vehicle as charge current via a second charging cable (4b), on which a charge plug (5), which fits the charge socket, is located. The energy accumulator is charged when contactors are additionally closed.

Figure 2:
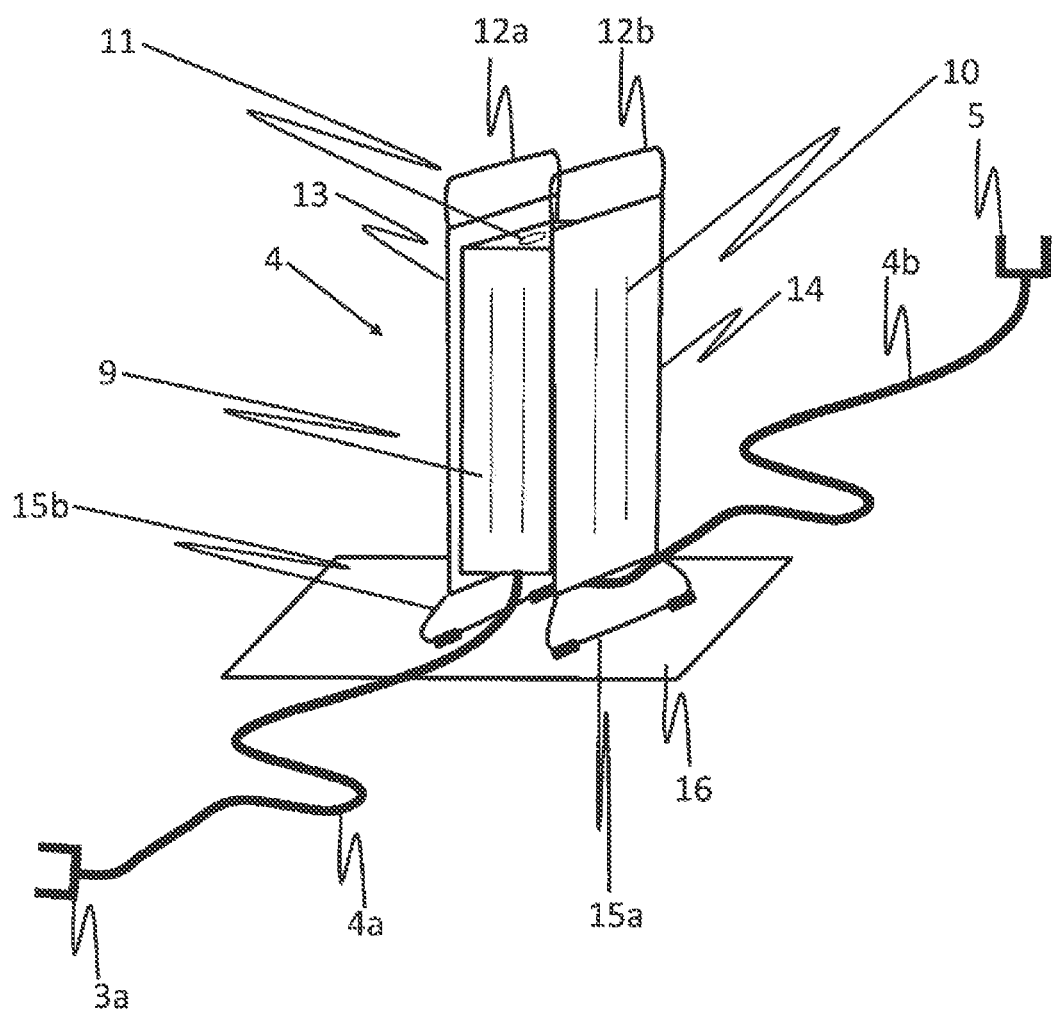
FIG. 2 is a schematic diagram of an exemplary charger device on a standing surface.

FIG. 2 shows an exemplary embodiment of the charger device. The charger device is composed essentially of a housing (9) into which an AC/DC transformer is integrated. The housing is closed off from the outside via a first housing lid (13) and a second housing lid (14).

Cooling fins (10), which have the effect of increasing the size of the surface area in order to bring about an optimized air cooling of the charger device, are formed in the housing and/or in the housing lid. Since the charger device is located outside the vehicle, the convective circulation of the surrounding air permits the heat which is generated during the rectification to be transported away.

For improved cooling of the air, the charger device also has at least one cooling duct (11) which penetrates the housing completely. According to the regulations, the at least one cooling duct is vertically oriented during the charging of the vehicle. During this orientation, a vertically directed flow, i.e. a flow with a preferred direction of flow counter to gravity, which is also referred to as the chimney effect, is produced, and it additionally promotes the heat transportation away from the charger device.

In addition, the charger device can be coated with a surface which has a high heat irradiation property and promotes the transportation of heat via the radiation of heat. This may be, for example, a thermoplastic coating which has a high irradiation tendency in the infrared region of the electromagnetic spectrum.

The charger device has two carrying handles (12*a*, 12*b*), which preferably have thermal insulation. This ensures that the carrying handles can be gripped without sensitivity to touch for a user even during a charging process.

In addition, the charger device is equipped with two stands (15*a*, 15*b*) with which the charger device can be positioned on a standing surface (16) according to the regulations.

Figure 3:
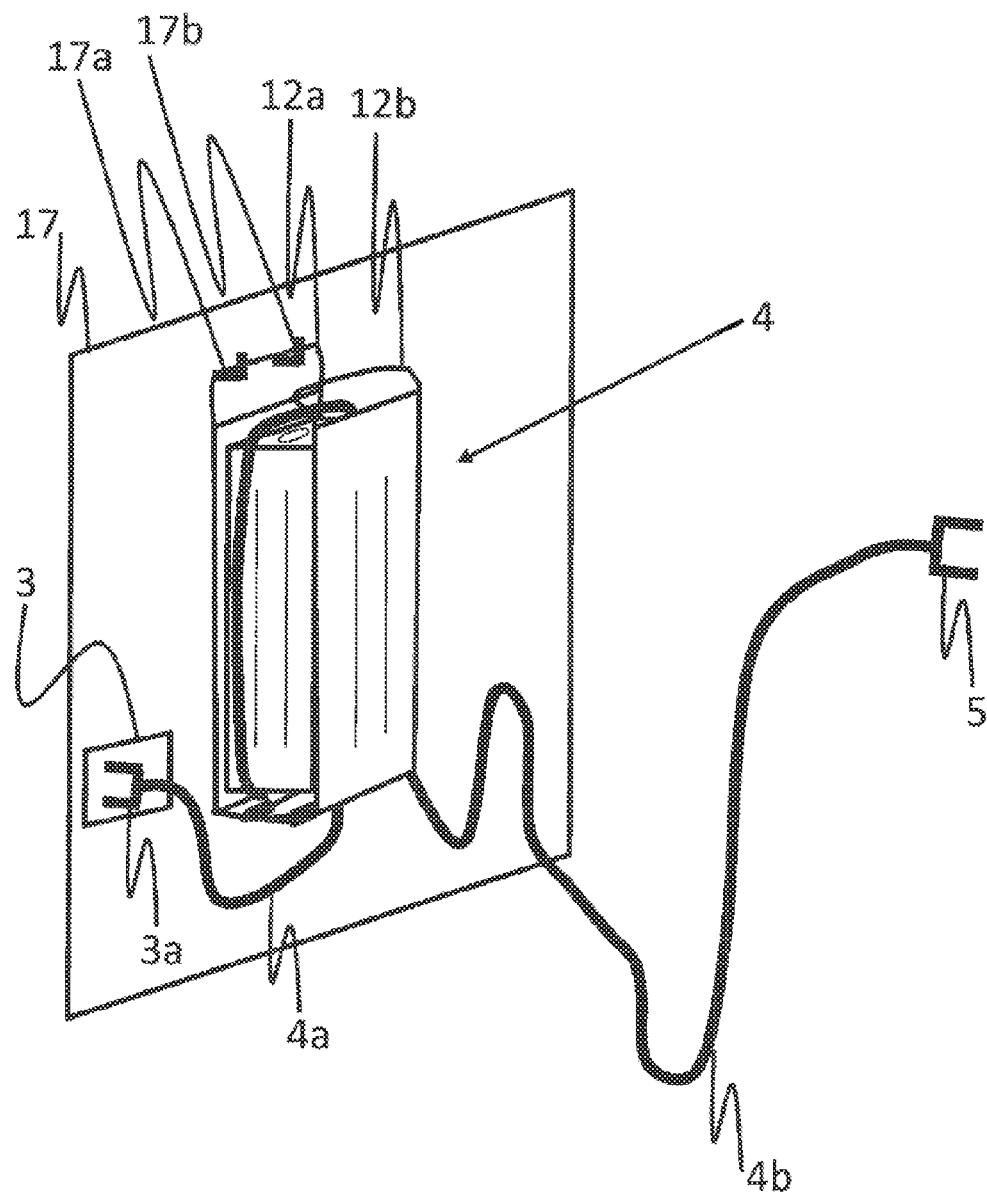
FIG. 3 is a schematic diagram of an exemplary charger device, fixed to a wall.

According to FIG. 3, the charger device can also alternatively preferably be attached to a wall (17) with a carrying handle. For this purpose, a suitable securing device is attached to the wall. This can be, for example, attachment hooks (17*a*, 17*b*).

Alternatively, the charger device can be suspended with a holding rail integrated into the carrying handle from a side window of the vehicle, which window is partially lowered. By closing the window and locking the vehicle, which can be triggered, for example, by the user by means of a remote control key of the vehicle or by means of a data communication between the charger device and the charge control unit when a connection is established between the charge plug and the charge socket, the charger device can be secured between the window and the associated window frame via the handle and, therefore, can be protected against theft.

Figure 4:
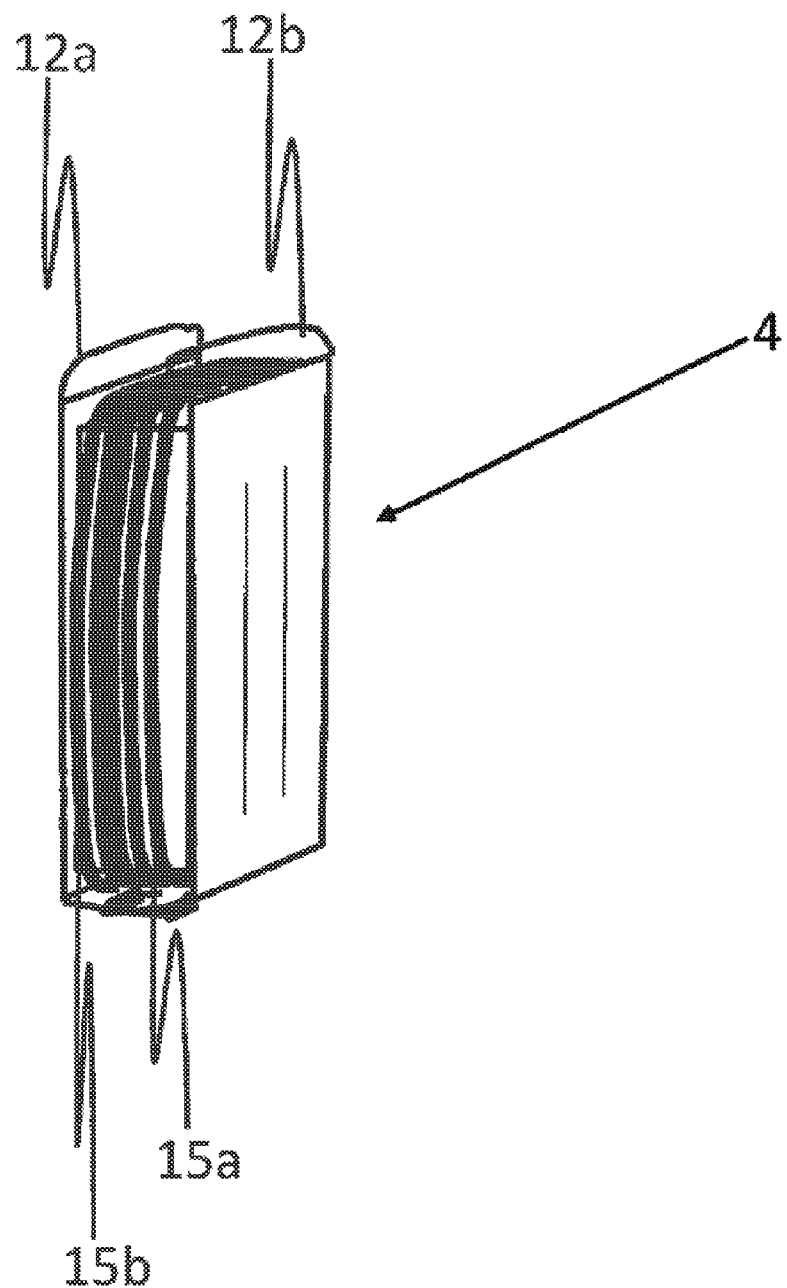
FIG. 4 is a schematic diagram of an exemplary charger device with cables wound on it.

According to FIG. 4, the housing and the two housing lids form a winding reel for the first and the second charging cables. Both charging cables can be wound onto the winding wheel. This facilitates the transportation of the charger device together with the charging cables since a compact geometric shape is obtained.

In addition, the carrying handles and the stands of the charger device can be configured in a foldable fashion. Folded in stands and carrying handles permit the wound-on cable, which has been wound onto the winding wheel, for example for storage or transportation of the charge device, to be secured.

For the purpose of transportation, the vehicle can be equipped with storage space (8), intended for the charger device, or a storage surface in the trunk, in order to carry along the charger device in the vehicle. If the charger device is not transported along, this storage surface can be used in other ways.

According to one alternative embodiment, the charger device has an integrated automatic cable retractor. The latter is preferably equipped with a main spring mechanism and a cable roller. The main spring and the cable roller can be configured for both charging cables, i.e. a cable roller has a pulling in mechanism for both charging cables and is coupled to a main spring. Alternatively, each charging cable is assigned a separate cable roller with a separate main spring.

All the safety functions which are ensured by use of an EVSE according to SAE J1772 can be integrated into the charger device. These are, for example, electrical insulation measures for parts which can be touched.

The charger device can be configured for operation at a single phase AC power system, for example the public AC power system in Germany with an effective voltage of 230 volts and a fuse device of 16 amperes, consequently for an input power of 3.68 kilowatts.

According to a further embodiment, the charger device can be configured for operation on a single phase AC power system with an effective voltage of 230 volts for an input power of 2.76 kilowatts. This means that in this case the charger device has a maximum input current of 12 amperes. This is particularly advantageous for a charging process possibly lasting several hours, for example to avoid heating of installation terminals during continuous charging at a domestic AC power terminal. This provides the charger device with the advantage that the AC/DC converter only has to be configured for charging cables associated with the charger device if the charging cable between the external AC power system and the charger device permits a maximum power transfer, for example owing to the line cross section. In this way, the charger device can be configured according to standards, for example according to SAE J1772.

The charge plug of the charging cable can have a fuse between the charger device and the vehicle or the same charging cable itself for protecting this electrical connection against return currents from the vehicle to the charger device. This permits a thin line cross section of the charging cable between the charger device and the vehicle.

The main advantage of the charger device is its mobility. The vehicle can be charged at any place having access to an AC power system without having a separate AC interface. This means that the plug in hybrid vehicle or electric vehicle can be charged via the DC charge socket, for example at a DC charging station. In addition, the vehicle can be charged at the AC power system by use of the charger device in the domestic sphere where generally only access to an AC power system is available. The charger device is only carried along when necessary when there is uncertainty about the availability of DC charging facilities along a route. Since the charger device is not integrated into a vehicle, it could be used with standardized hardware and software interfaces, that is to say for example when there is charge plug/charge socket compatibility or data interfaces between the charger device and the vehicle, even independently of different vehicle types. The charger device can therefore be used universally and can be manufactured cost effectively.

As a result, an advantage in terms of installation space, an advantage in terms of weight and a functional advantage are obtained compared to a vehicle with an integrated AC charging architecture. There is no need to integrate a charger device in the vehicle according to FIG. 1, which provides a saving in terms of weight and permits the installation space of the charger device to be available for an alternative use or to save the installation space completely. Keeping available a simple storage surface, for example in the boot of the vehicle, does not constitute integrating the charger device into the vehicle and hardly affects installation space considerations at all. In addition, the vehicle according to FIG. 1 is equipped with a single charging station which is embodied as a DC charging interface with switchable (protective) contactor switches and which requires relatively low expenditure on integration and provides a saving in weight compared to the integration of an AC charging interface with a charger. This provides the additional functional advantage that the vehicle can also be charged directly at an external DC power source via the DC interface. The charging possibilities are therefore expanded compared to a vehicle with a single integrated charging interface, which is embodied as an AC charging interface with a charger device, since the vehicle according to FIG. 1 can be charged at an external AC power source via the charger device or alternatively can be connected directly to an external DC power source with a charging cable for the purpose of charging.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charge system, comprising:
    a vehicle with a charge socket and a contactor switching unit, and
    a portable vehicle-external charger configured to charge an electrical energy accumulator of the vehicle from a vehicle-external AC power system, the charger comprising:
        an AC-DC converter,
        a first charging cable having an AC power system plug,
        a second charging cable having a charge plug, and
        a housing having:
            opposing first and second lids forming a winding reel, the first and second charging cables windable onto the winding reel,
            a foldable carrying handle configured to secure at least one charging cable wound onto the winding reel, and
            a foldable stand configured to: secure at least one charging cable wound onto the winding reel when folded, and to be stood on by the charger when unfolded such that all but the foldable stand of the charger is elevated away from a standing surface.

2. The charge system according to claim 1, wherein:
    the housing has external cooling fins, and
    the housing is penetrated by at least one cooling duct, which is configured for a flow of air through the housing.

3. The charge system according to claim 2, wherein:
    the housing for the first charging cable has an automatic cable retractor, and
    the housing for the second charging cable has an automatic cable retractor.

4. The charge system according to claim 1, wherein the charger has at least one thermally insulated carrying handle and at least one thermally insulated stand.

5. The charge system according to claim 3, wherein the charger has at least one thermally insulated carrying handle and at least one thermally insulated stand.

6. The charge system according to claim 4, wherein the charger is securable by the at least one stand in order to charge on the standing surface.

7. The charge system according to claim 1, wherein the charger is securable by the at least one stand in order to charge on the standing surface.

8. The charge system according to claim 4, further comprising:
    an attachment mechanism for a wall, wherein
    the charger is securable to the attachment mechanism by the at least one carrying handle for the purpose of charging.

9. The charge system according to claim 1, further comprising:
    an attachment mechanism for a wall, wherein
    the charger is securable to the attachment mechanism by the at least one carrying handle for the purpose of charging.

10. The charge system according to claim 4, wherein:
    the at least one carrying handle comprises a holding rail, and
    the charger is suspendable with the holding rail from a partially lowered side window of the vehicle.

11. The charge system according to claim 1, wherein:
    the at least one carrying handle comprises a holding rail, and
    the charger is suspendable with the holding rail from a partially lowered side window of the vehicle.

12. The charge system according to claim 2, wherein at least one of the housing, the first lid or the second lid have a heat-irradiating surface coating.

13. The charge system according to claim 1, wherein:
    the second charging cable or the charging plug has a fuse, and
    the fuse is configured to protect the second charging cable when a connection is established between the charge plug and the charge socket against a flow of current from the vehicle to the charger.

14. The charge system according to claim 1, wherein:
    the vehicle comprises a charge control unit, and
    charge control signals from the charger via the second charging cable are detectable by way of the charge control unit.

15. The charge system according to claim 14, wherein:
    the vehicle comprises a storage space, and
    the storage space is configured to transport the portable charger device.

16. The charge system according to claim 1, wherein:
    the vehicle comprises a storage space, and
    the storage space is configured to transport the portable charger device.

* * * * *